(12) United States Patent
Alvarez et al.

(10) Patent No.: US 6,357,337 B1
(45) Date of Patent: Mar. 19, 2002

(54) SPRING BRAKE ACTUATOR WITH SEALED CHAMBER AND METHOD FOR SEALING

(75) Inventors: Francisco Alvarez, Muskegon; Mark A. Davis, Sparta, both of MI (US)

(73) Assignee: Holland Neway International, Inc., Muskegon, MI (US)

( * ) Notice: Subject to any disclaimer, the term of this patent is extended or adjusted under 35 U.S.C. 154(b) by 0 days.

(21) Appl. No.: 09/549,188

(22) Filed: Apr. 14, 2000

Related U.S. Application Data

(60) Provisional application No. 60/139,211, filed on Jun. 15, 1999.

(51) Int. Cl.[7] ................................................. F01B 19/00
(52) U.S. Cl. ........................................ 92/98 R; 92/128
(58) Field of Search ................................ 92/98 R, 101, 92/62, 128

(56) References Cited

U.S. PATENT DOCUMENTS

| | | | |
|---|---|---|---|
| 4,455,829 A | * | 6/1984 | Seip ............................. 92/128 |
| 5,067,391 A | | 11/1991 | Choinski et al. |
| 5,315,918 A | * | 5/1994 | Pierce ............................. 92/63 |
| 5,676,036 A | * | 10/1997 | Choinski ..................... 92/128 |
| 5,771,774 A | * | 6/1998 | Stojic .......................... 92/128 |
| 6,223,647 B1 | * | 5/2001 | Plantan et al. ................. 92/128 |

* cited by examiner

Primary Examiner—Edward K. Look
Assistant Examiner—Igor Kershteyn
(74) Attorney, Agent, or Firm—McGarry Bair LLP

(57) ABSTRACT

A sealed vehicle brake actuator having a housing divided into a first chamber and a second chamber by a movable member such as a diaphragm. The housing comprises a first and second portion joined with the diaphragm therebetween to seal the portions to one another and mount the diaphragm. The joint is formed by deforming at least a part of the first portion into a groove formed in the second portion with the diaphragm pinched between first and second housing portions. The deforming of a part of the first portion into the groove can be accomplished by deforming the wall edge of the first portion, continuously or discretely, into the groove, preferably by rolling. Alternatively, the sidewall of the first portion overlying the groove can be deformed into the groove by rolling the first portion, continuously or discretely, or by discretely punching the sidewall.

28 Claims, 2 Drawing Sheets

SPRING BRAKE ACTUATOR WITH SEALED CHAMBER AND METHOD FOR SEALING

RELATED APPLICATION

This application claims the benefit of U.S. Provisional Patent Application No. 60/139,211, which was filed on Jun. 15, 1999.

BACKGROUND OF THE INVENTION

1. Field of the Invention

The invention relates to fluid-operated brake actuators for vehicles and, more particularly, to a fluid-operated actuator with a sealed chamber and a method for sealing the chamber.

2. State of the Prior Art

An air brake system for a vehicle such as a bus, truck or the like typically includes a brake shoe and drum assembly actuated by an air-operated brake actuator. Conventional air brake actuators have both a service brake actuator for actuating the brakes under normal driving conditions by the application of compressed air and an emergency or spring brake actuator that actuates the brakes when air pressure has been released. The spring brake actuator includes a large-force compression spring that is compressed by the pressurized air and expands to apply the brakes when the air is released. Typically, the spring brake actuator is disposed in tandem with the service brake actuator.

The spring brake actuator typically comprises a housing formed by opposing cup-shaped housing portions. The housing is divided into two chambers by a diaphragm, whose peripheral edge is compressed between the housing portions, with the spring in one of the chambers (the spring chamber) acting between an end wall of the spring brake housing and a pressure plate abutting the diaphragm. When air pressure is applied to the opposite chamber (the pressure chamber), air pressure acting against the diaphragm and pressure plate compresses the spring.

In tandem actuator assemblies, a spring brake push rod typically extends from the pressure plate/diaphragm assembly in the spring brake actuator portion, through an aperture in a wall separating the spring brake actuator from the service brake actuator, and into a chamber in the service brake. In many applications, the spring brake actuator rod is held retracted against the pressure plate/diaphragm assembly by a relatively small return spring. In newer applications, the spring brake actuator rod is integral with the pressure plate and held in a retracted position by the air pressure. For each design, the spring brake actuator rod does not affect the normal operation of the brake.

The service chamber is typically divided into two chambers by a second diaphragm. Depressing the brake pedal during normal driving operation introduces compressed air into one of the chambers of the service brake actuator which, acting against the second diaphragm, causes a service brake push rod on the other side of the diaphragm to extend and apply the brakes with an application force proportional to the air pressure in the service brake actuator.

In the event of a loss of air pressure or an intentional exhaustion of air from the spring brake actuator, the large-force compression spring expands to extend the spring brake actuator rod which, in turn, extends the service brake push rod to apply the brakes. Thus, the spring brake portion serves both as a parking brake and as an emergency brake.

Because a large-force spring is necessary to actuate the brakes in the case of an accidental loss of pressure or the purposeful depressurization for a parking brake, the housing portions containing the large-force spring must be securely held together for normal operation and to avoid injury from dislocation of the housing portions under the force of the spring. Further, the attachment of the housing portions must dissuade tampering, such as by unqualified mechanics, because the large-force spring will cause injury if it is not properly caged prior to servicing. Finally, the joint coupling the housing portions should accommodate a sealed mounting of the diaphragm, which is conventionally mounted between the housing portions and also provides a sealed attachment of the housing portions.

Some prior designs have attempted to address the problem of reducing or eliminating the risk of injury to persons or dislocation of housing portions by continuously rolling a lip of one housing portion about a lip of the other with the diaphragm therebetween, whereby the assembled housing is sealed and cannot be disassembled without destruction. While the joint is strong enough to contain the spring, it is expensive to manufacture.

SUMMARY OF THE INVENTION

The invention relates to an air-operated brake actuator for applying the brakes of a vehicle comprising first and second housing sections between which is sandwiched a diaphragm. The first housing section comprises a first end wall, a first peripheral side wall extending away from the first end wall to define a first interior cavity. An edge surface is provided on an outer exterior of the first peripheral side wall, and an indentation is formed within at least a portion of the edge surface. The second housing section comprising a second end wall and a second peripheral side wall extending away from the second end wall to define a second interior cavity adjacent the diaphragm. A portion of the second peripheral side wall and first peripheral side wall sandwich a circumferential edge portion of the diaphragm. The second peripheral side wall has an end portion that overlaps the edge surface and the indentation and further has at least one projection extending into the indentation to secure the second housing section to the first housing section with the diaphragm sealingly clamped therebetween whereby the second housing section cannot be separated from the first housing section without deforming the second housing section.

Preferably, the edge surface further comprises a groove in which is received a portion of the diaphragm circumferential edge and the diaphragm includes a bead received in the edge surface groove. The first peripheral side wall includes a radially extending lip that terminates in the edge surface and the second peripheral side wall end portion is generally parallel to the edge surface to sandwich the diaphragm between the edge surface and the second peripheral side wall end portion. The indentation can be a continuous or discontinuous groove and the projection can be multiple deformations, such as punches or bent portions, received within the groove.

DETAILED DESCRIPTION OF THE DRAWINGS

Figure 1:
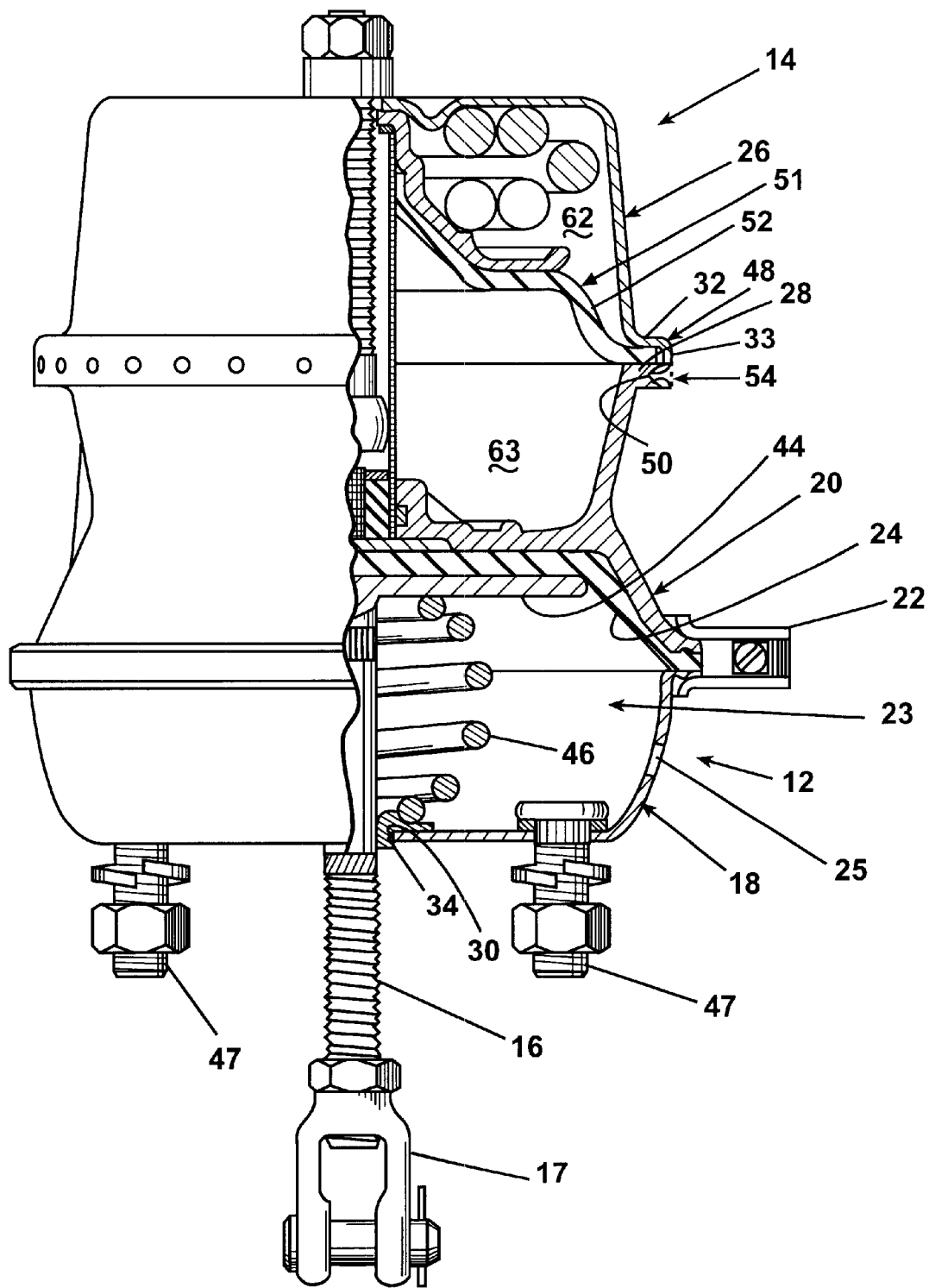
FIG. 1 is a partially sectioned view of a fluid-operated brake actuator having a sealed chamber according to the invention.

FIG. 1 illustrates a fluid-operated brake actuator 10 comprising a service brake actuator 12 mounted in tandem to a spring brake actuator or emergency brake actuator 14. Although the invention is illustrated with respect to a fluid-operated spring brake having a tandem construction, the invention can be used in any type of brake, including non-tandem, fluid-operated spring brakes in which the spring chamber is separated from the service chamber.

A service brake push rod 16 extends from the service brake actuator 12 for reciprocating movement between a retracted position and an extended actuating position relative to the service brake actuator 12, and has a clevis 17 adapted to connect to a conventional brake shoe and drum (not shown) in a standard fashion. Reciprocating motion of the service brake push rod 16 provides activating means for alternately applying and releasing the brake.

The service brake actuator 12 has a housing defined by a cup-shaped service housing section 18 and a double cup-shaped adapter housing 20 joined together by a clamp 22 to form a service brake chamber 23. The adapter housing 20 is also sometimes known as a flange case. The service brake chamber 23 is divided into two sections by a dividing means. Preferably, the dividing means is a first elastomeric diaphragm 24 (also known as the service brake diaphragm) suspended within the service brake chamber 23, the peripheral edge thereof secured in fluid tight enclosure between the cup-shaped service housing section 18 and the service side of the adapter housing 20 by the clamp 22. Mounting studs 47 are provided on housing section 18 to mount the fluid-operated brake actuator 10 onto a vehicle (not shown).

The first elastomeric diaphragm 24 separates the service brake chamber 23 into two portions: a first service chamber portion and a second service chamber portion. The first service chamber portion communicates with a source of pressurized air (not shown) through an air service port (not shown) in the adapter housing 20. The second service chamber portion is vented to the atmosphere through at least one vent opening 25 in the cup-shaped service housing section 18. In FIG. 1, the first service chamber portion is shown evacuated so that the first elastomeric diaphragm 24 is forced against the adapter housing 20 because of the force from return spring 46 in the second service chamber portion.

The service brake push rod 16 extends through a central opening 30 in the cup-shaped service housing section 18 and has a pressure plate 44 at the end thereof within the second service chamber portion. The pressure plate 44 bears against the first elastomeric diaphragm 24. The return spring 46 extends between the pressure plate 44 and the interior surface of the cup-shaped service housing section 18. A push rod guide 34 having an annular seat is disposed within the central opening 30 to guide reciprocal movement of the service brake push rod 16 within the central opening 30 and also to receive the end of the return spring 46 and retain it in position around the central opening 30. The return spring 46 urges the pressure plate 44 and the service brake push rod 16 to a fully retracted position as depicted in FIG. 1.

To operate the service brake actuator 12, compressed air is introduced through the air service port into the first service chamber portion to create a force against the first elastomeric diaphragm 24 and pressure plate 44 sufficient to overcome the force of the return spring 46, thereby extending the service brake push rod 16 toward the actuating position. The vent openings 25 in housing section 18 permit rapid evacuation of air from the second service chamber as the service brake is actuated.

The spring actuator or emergency brake actuator 14 has a housing comprising a cylindrical housing section 26 joined to a side of the adapter housing 20 opposite the housing section 18 and defining a spring chamber 51. The spring brake actuator 14 is divided into two portions by a movable member such as a second elastomeric diaphragm 52, known as the spring diaphragm, that is suspended within the spring brake chamber 51. In other brake configurations, the movable member may be a piston. The peripheral edge of the spring brake diaphragm 52 is secured between the housing section 26 and the adapter housing 20. The second elastomeric diaphragm 52 divides the spring brake chamber 51 into two portions: a first spring chamber portion 62 and a second spring chamber portion 63. The second spring chamber portion 63 is filled with pressurized air supplied through an air service port (not shown) in the adapter housing 20 when the emergency brake is in its normal released position as depicted in FIG. 1. The cylindrical housing section 26 includes one or more ports (not shown) therein which establish communication between the first spring chamber portion 62 and the atmosphere.

Figure 2:
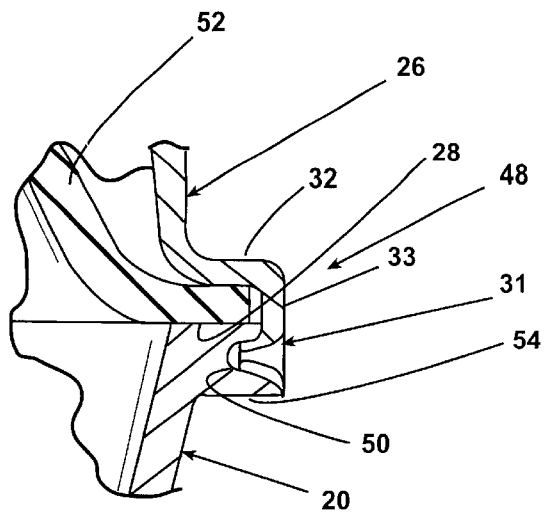
FIG. 2 is an enlarged, fragmentary cross-sectional view of a portion of the sealed chamber of FIG. 1.

As shown in FIGS. 1 and 2, the housing section 26 is joined to the adapter housing 20 by deforming end portion 48 of the housing section 26 into a groove 50 formed in an end 54 of the adapter housing 20. More specifically, the end 54 of the adapter housing 20 extends laterally to form a ledge 28. The end portion 48 of the housing section 26 is generally L-shaped and extends first radially outwardly 32 and then axially 33. The diaphragm 52 is sandwiched between the radial portion 32 and the ledge 28. The axially extending portion 33 includes a series of discontinuous deformations 31 that are received in the groove 50 to secure the housing section 26 to the adapter housing 20 with the diaphragm therebetween to seal the joint. The deformations 31 are characterized by punching the end portion 48 of the housing section 26 into the groove 50 such that the deformations 31 pierce the housing section 26.

Figure 3:
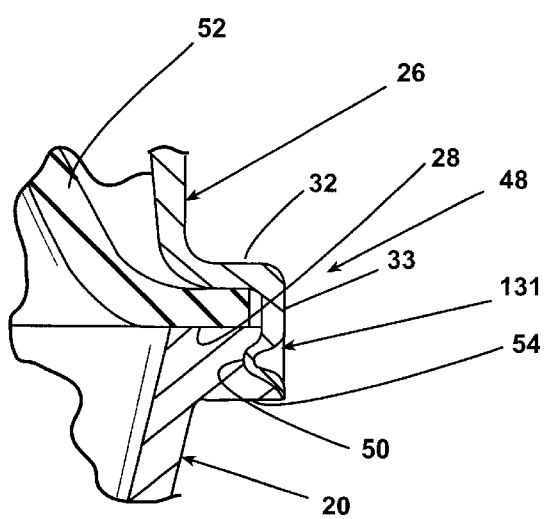
FIG. 3 is an enlarged, fragmentary cross-sectional view of a portion of the sealed chamber according to a second embodiment of the invention.

A second embodiment is illustrated in FIG. 3 and is identical to the first embodiment except that the deformations 131 do not pierce the housing 26.

Figure 4:
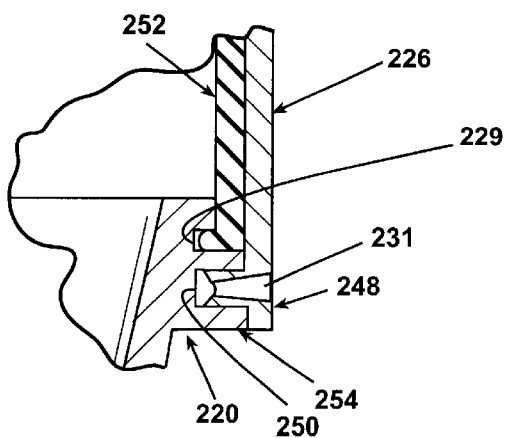
FIG. 4 is an enlarged, fragmentary cross-sectional view of a portion of the sealed chamber according to a third embodiment of the invention.

A third embodiment is illustrated in FIG. 4. In the third embodiment, like parts will be identified by like numerals preceded by the 200 prefix. A housing section 226 is joined to an adapter housing 220 by deforming an end 248 of the housing section 226 into a groove 250 formed in an end 254 of the adapter housing 220. Further, a groove 229 formed in the end 254 receives the end of the diaphragm 252. More specifically, the end 254 of the adapter housing 220 includes the groove 250 adjacent the groove 229. After insertion of its end in the groove 229, the diaphragm 252 is pinched between the end 248 of the housing section 226 and the end 254 of the adapter housing 220. The end 248 of the housing includes a series of discontinuous deformations 231 that are received in the groove 250 to secure the housing section 226 to the adapter housing 220 with the diaphragm 252 therebetween to seal the joint. The deformations 231 are characterized by piercing the end 248 of the housing section 226 into the groove 250. Preferably the deformations 231 are punched into the housing section 226 during assembly of the brake actuator 10.

Figure 5:
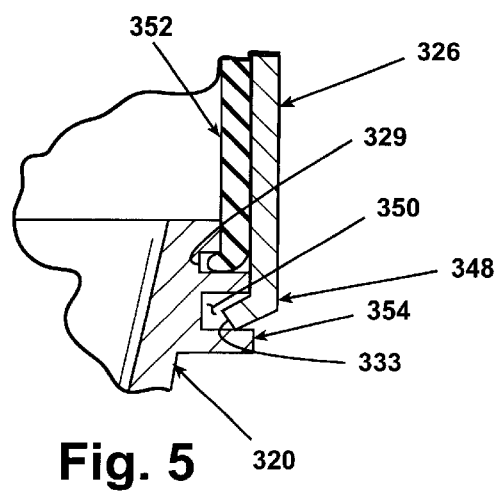
FIG. 5 is an enlarged, fragmentary cross-sectional view of a portion of the sealed chamber according to a fourth embodiment of the invention.

As depicted in FIG. 5, elements of the fourth embodiment of the invention are shown, which are similar to the previous embodiments. In the fourth embodiment, like parts will be identified by like numerals preceded by the 300 prefix. The housing section 326 is joined to the adapter housing 320 by deforming the end 348 of the housing section 326 into the groove 350 formed in the end 354 of the adapter housing 320. Further, the groove 329 formed in the end 354 receives the end of the diaphragm 352. More specifically, the end 354 of the adapter housing 320 includes the groove 350 adjacent the groove 329. After insertion of its end in the groove 329, the diaphragm 352 is pinched between the end 348 of the housing section 326 and the end 354 of the adapter housing 320. The end 348 includes a series of discontinuous deformations 333 that are received in the groove 350 to secure the housing section 326 to the adapter housing 320 with the diaphragm 352 therebetween to form a joint that seals and secures the housing.

The deformations 333 are characterized by bending distal or edge sections of the end 348 of the housing section 36 into the groove 350. Preferably, the edge 333 is continuously deformed into the groove 350 and the groove 350 extends around the circumference of the housing 320. It is also preferred that the edge 333 of the end 348 be oriented at an angle with respect to the groove 350 to reduce the tolerances required to deform the edge 333 into the groove 350. Rolling is the preferred method for deforming the edge 333 into the groove 350.

The third and fourth embodiments differ from the first and second embodiments by having a straight end 248, 348 instead of an L-shaped end 48. The straight end traps the diaphragm 252, 352 between a portion of the adapter housing end 254, 354 and the housing end 348 instead of between the ledge 28 and the housing end 48.

The fourth embodiment is advantageous over the third embodiment in that the assembly tolerances are less strict because the deformed edge 333 need only be retained in the groove whereas the punch must be aligned with the groove.

Reasonable variation and modification are possible within the scope of the foregoing disclosure without departing from the spirit of the invention which is defined in the accompanying claims. For instance, a check valve can be used in the service chamber. Furthermore, the check valve of the invention can be used in a fluid-brake not having a tandem mounted spring and service chamber.

What is claimed is:

1. An air-operated spring brake actuator for applying the brakes of a vehicle, the spring brake actuator comprising:
   a first housing section comprising a first end wall, a first peripheral side wall extending away from the first end wall to define a first interior cavity, an edge surface provided on an outer exterior of the first peripheral side wall, and an indentation formed within at least a portion of the edge surface;
   a diaphragm extending over the first interior cavity and terminating in a circumferential edge portion;
   a second housing section comprising a second end wall and a second peripheral side wall extending away from the second end wall to define a second interior cavity adjacent the diaphragm, with a portion of the second peripheral side wall and first peripheral side wall sandwiching the diaphragm circumferential edge portion therebetween;
   a compression spring disposed within the first interior cavity and operable between a retracted position and an extended position to move the diaphragm away from and toward the second end wall; and
   wherein the second peripheral side wall has an end portion that overlaps the edge surface and the indentation and further has multiple, discrete punched portions extending into the indentation to secure the second housing section to the first housing section with the diaphragm sealingly clamped therebetween whereby the second housing section cannot be separated from the first housing section without deforming the second housing section.

2. The spring brake actuator according to claim 1, wherein the edge surface further comprises a groove in which is received a portion of the diaphragm circumferential edge.

3. The spring brake actuator according to claim 2, wherein the diaphragm circumferential edge comprises a bead that is received within the edge surface groove.

4. The spring brake actuator according to claim 3, wherein the first peripheral side wall includes a radially extending lip that terminates in the edge surface and the second peripheral side wall end portion is generally parallel to the edge surface to sandwich the diaphragm between the edge surface and the second peripheral side wall end portion.

5. The spring brake actuator according to claim 4, wherein the indentation is a groove in the edge surface extending around the periphery of the second peripheral side wall.

6. The spring brake actuator according to claim 5, wherein the groove is formed of multiple spaced groove segments.

7. The spring brake actuator according to claim 6, at least one punched portion is received within each groove segment.

8. The spring brake actuator according to claim 1, wherein the first peripheral side wall includes a radially extending lip defining a second edge and edge surface, wherein the edge surface extends radially and the second peripheral side wall end portion is generally parallel to the edge surface.

9. The spring brake actuator according to claim 8, wherein the diaphragm is sandwiched between the edge surface and the second peripheral side wall end portion.

10. The spring brake actuator according to claim 9, wherein the second peripheral side wall includes a radially extending flange that overlies the first peripheral side wall second peripheral side edge and the diaphragm circumferential edge portion to sandwich the diaphragm therebetween, and the second peripheral side wall end portion extends from the flange.

11. The spring brake actuator according to claim 10, wherein the indentation is a groove in the edge surface and extends around the periphery of the second peripheral side wall.

12. The spring brake actuator according to claim 11, wherein the groove is formed of multiple spaced groove segments.

13. The spring brake actuator according to claim 1, wherein the indentation is a groove extending around the periphery of the second peripheral side wall.

14. The spring brake actuator according to claim 13, wherein the groove is formed of multiple spaced groove segments.

15. The spring brake actuator according to claim 1, and further comprising an actuator having first and second ends and slidably mounted within an opening in the second end wall such that the first end is disposed within the second interior cavity and operably coupled to the diaphragm and the second end is disposed exteriorly of the second housing and adapted to be operably coupled to a vehicle brake whereby the movement of the compression spring between the retracted and extended positions results in a corresponding movement of the actuator to effect the actuation of a brake.

16. The spring brake actuator according to claim 15, and further comprising a pressure plate disposed between the compression spring and the diaphragm to operably couple the compression to the diaphragm.

17. An air-operated spring brake actuator for applying the brakes of a vehicle, the spring brake actuator comprising:

a first housing section comprising a first end wall, a first peripheral side wall extending away from the first end wall to define a first interior cavity, an edge surface provided on an outer exterior of the first peripheral side wall, and an indentation formed within at least a portion of the edge surface;

a diaphragm extending over the first interior cavity and terminating in a circumferential edge portion;

a second housing section comprising a second end wall and a second peripheral side wall extending away from the second end wall to define a second interior cavity adjacent the diaphragm, with a portion of the second peripheral side wall and first peripheral side wall sandwiching the diaphragm circumferential edge portion therebetween;

a compression spring disposed within the first interior cavity and operable between a retracted position and an extended position to move the diaphragm away from and toward the second end wall; and wherein the second peripheral side wall has a end portion that overlaps the edge surface and terminates in a distal edge portion and only the distal edge portion is deformed to extend into the indentation to secure the second housing section to the first housing section with the diaphragm sealingly clamped therebetween whereby the second housing section cannot be separated from the first housing section without deforming the second housing section.

18. The spring brake actuator according to claim 17, wherein the edge surface further comprises a groove in which is received a portion of the diaphragm circumferential edge.

19. The spring brake actuator according to claim 18, wherein the diaphragm circumferential edge comprises a bead that is received within the edge surface groove.

20. The spring brake actuator according to claim 19, wherein the first peripheral side wall includes a radially extending lip that terminates in the edge surface and the second peripheral side wall end portion is generally parallel to the edge surface to sandwich the diaphragm between the edge surface and the second peripheral side wall end portion.

21. The spring brake actuator according to claim 20, wherein the indentation is a groove in the edge surface extending around the periphery of the second peripheral side wall.

22. The spring brake actuator according to claim 21, wherein the groove is formed of multiple spaced groove segments.

23. The spring brake actuator according to claim 17, wherein the first peripheral side wall includes a radially extending lip defining a second edge and edge surface, wherein the edge surface extends radially and the second peripheral side wall end portion is generally parallel to the edge surface.

24. The spring brake actuator according to claim 23, wherein the diaphragm is sandwiched between the edge surface and the second peripheral side wall end portion.

25. The spring brake actuator according to claim 24, wherein the second peripheral side wall includes a radially extending flange that overlies the first peripheral side wall second peripheral side edge and the diaphragm circumferential edge portion to sandwich the diaphragm therebetween, and the second peripheral side wall end portion extends from the flange.

26. The spring brake actuator according to claim 25, wherein the indentation is a groove in the edge surface and extends around the periphery of the second peripheral side wall.

27. The spring brake actuator according to claim 26, wherein the groove is formed of multiple spaced groove segments.

28. The spring brake actuator according to claim 17, wherein the distal edge portion is deformed into the indentation entirely about the periphery of the second peripheral side wall.

* * * * *